Jan. 25, 1966     K. SPIESS ETAL     3,230,617
METHOD AND APPARATUS FOR ASSEMBLING UNIVERSAL JOINTS
Filed Aug. 21, 1964     4 Sheets-Sheet 1

INVENTORS
Karl Spiess
Harald Schönfeld

BY

Hammond + Little

ATTORNEYS

INVENTORS
Karl Spiess
Harald Schönfeld

BY
*Hammond & Littell*

ATTORNEYS

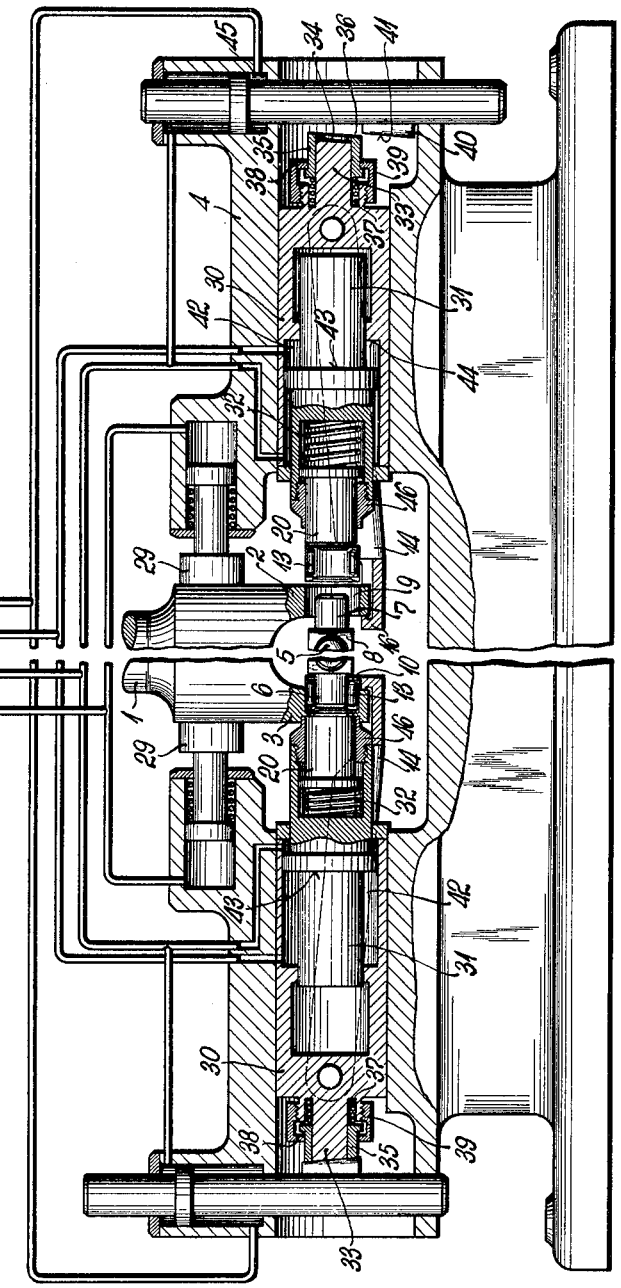

United States Patent Office 3,230,617
Patented Jan. 25, 1966

3,230,617
METHOD AND APPARATUS FOR ASSEMBLING UNIVERSAL JOINTS
Karl Spiess and Harald Schönfeld, Herzogenaurach, Germany, assignors to Industriewerk Schaeffler, Herzogenaurach, Germany, a corporation of Germany
Filed Aug. 21, 1964, Ser. No. 391,246
Claims priority, application Germany, Aug. 27, 1963, J 24,322
13 Claims. (Cl. 29—434)

The invention relates to a novel method and apparatus for assembling universal joints formed by the connection of two shafts forked at their ends with a universal joint spider and having radially and axially loadable bearings arranged in bores in the shaft forks for accommodating the spider trunnions.

The term "universal joint" is used to designate a pivotable connection between two rotating shafts wherein the mutually facing ends of the shafts are forked to form two fork arms each of which is provided with a bore. The shafts are turned through 90° relative to each other so that the axes of the bores in the fork arms of one shaft are at right angles to the axes in the bores of the fork arms of the other shaft. The two shafts are connected by a universal joint spider mounted in the bores in the fork arms. Rolling contact bearings such as needle bearings are usually used in this case to reduce friction.

When arranging a rigid shaft connection, inaccuracies in alignment between the two shafts can be compensated for at the final fitting in their mountings. However, in a universal joint, care must be taken even at the stage of assembling the joint that the axes are in exact alignment and to achieve this accuracy it is absolutely necessary when mounting the spider in the bores of the fork arms of a shaft that it be exactly centered, i.e. the shaft axis must pass through the center of the universal joint spider.

After the spider with its trunnions has been inserted into the bores of the two fork arms of a shaft, the bearings may be pressed-in. The bearings, which are capable of accepting both radial and axial loads, are pressed from the outside into the bores and simultaneously onto the spider trunnions. The force needed for such pressing-in acts through the bearings on the fork arms and tends to press them away. If this were permitted, the bearings would first be pressed-in until they abutted flush against the spider trunnions, but when the pressing-in force was removed, the fork arms would spring back again and move the bearing away from the spider trunnions whereby play-free abutment of the bearing would not be guaranteed. In order for the bearings to accept the forces which occur in the operation of the universal joint, the bearings must be applied against the trunnions without any play.

Due to the variances in the lengths of the trunnions and the thickness of the fork arms which always occur, the pressing-in depth is variable within a certain degree. While it is possible to keep tolerances at a minimum in the case of the trunnions, minimum tolerances can be achieved in the case of the fork arm thickness only by complicated additional methods since these arms are generally made of malleable cast iron. Therefore, in order not to make manufacture too expensive, it must be possible for the variances to be as large as possible. Independently of this, however, the bearings must always be pressed-in until they abut against the trunnions without any clearance and this requires that the bearings can be fixed at any desired point in the bores. To compensate for any play which comes about as a result of wear in the axial direction between the bearing and the bore, the bearings should be pressed against the trunnions with pre-loading as far as possible.

It is an object of the invention to provide a novel method of assembling universal joints wherein after the two shafts and the universal joint spider have been centered relative to one another, the bearings can be pressed-in under pre-load against the spider trunnions without free play.

It is another object of the invention to provide a novel apparatus for accurately assembling the universal joints without free play between the bearings and the spider trunnions.

These and other objects and advantages of the invention will become obvious from the following detailed description.

The method of the invention for assembling universal joints formed by the connection of two shafts forked at their ends with a universal joint spider and having radially and axially loadable bearings for accommodating the spider trunnions arranged in bores in the shaft forks comprises centering the spider and the shaft forks relative to one another and pressing each bearing into the bore of the fork arm until it abuts without free play against the spider trunnion while supporting the reaction force resulting from the pressing-in force at the fork arm. Further action of the pressing-in force causes the reaction force acting on the fork arm to widen the arm elastically to an adjustable extent oppositely to the pressing-in direction while the bearing remains in play-free abutment against the spider trunnion. With and/or after the ending of the widening of the fork arm, the bearing, abutting in a play-free manner on the spider trunnion, is secured in the bore of the fork arm and when thereafter the pressing-in force is removed, the pre-load produced by the widening of the fork arm acts on the bearing and presses it against the spider trunnion. This method permits the bearing to be pressed-in irrespective of accurate trunnion length and fork arm thickness and the bearings are pressed under pre-load against the spider trunnion.

Although the pressing-in of only one bearing has been referred to so far, it is quite possible for two oppositely-situated bearings or all the bearings of the universal joint to be pressed-in and/or fixed simultaneously, with one another.

The bearing may be pressed into the bore by a ram connected to a device which produces the pressing-in force and is displaceable relative to the fork arm in the axial direction of the bore. Between the said device and the fork arm, there are members for transmitting the reaction force. Owing to the transmission of the pressing-in force to the fork arm, the latter is acted upon from one side by the pressing-in force and from the other side by the equally great reaction force. Therefore, there is an equilibrium of forces and displacement of the fork arm is impossible. Since the device for producing the pressing-in force is mounted so that it is displaceable in the axial direction of the bore, it can be displaced relatively to the fork arm before the bearing is pressed-in. Thus, the members for transmitting the reaction force may be applied independently of the variations in the thickness of the fork arm. An adjustable member limits the displacement travel of the device opposite to the pressing-in direction.

The device producing the pressing-in force may consist of a cylinder which is displaceable in the direction of the fork arm bore and a piston which is slidably mounted in the cylinder and is connected to the pressing-in ram and is operated, for example, by oil pressure. The cylinder is provided with holding clips which engage on the fork arm and transmit reaction force.

The abutment member limiting the movement of the device may consist of a wedge which is movable at right angles to the direction of displacement of the device and the wedge surface of which is inclined in the direction of movement and can abut against an appropriately-inclined surface. This abutment member may be provided with a part which is under the influence of a force and projects by an adjustable amount beyond its abutment surface. The force acting on the said part is greater than the force which occurs when the abutment member abuts.

The ram for pressing-in and/or fixing the bearing may be provided for example with projections, the outer edges of which lie on a diameter which is greater than the bore diameter. Alternatively, it is possible for the fixing of the bearing to be carried out by a fixing ram surrounding the pressing-in ram in annular manner.

Referring now to the drawings—

FIG. 8 illustrates one embodiment of an apparatus for carrying out the method; on the right, before the pressing-in operation and on the left, after the pressing-in operation.

Figure 1:
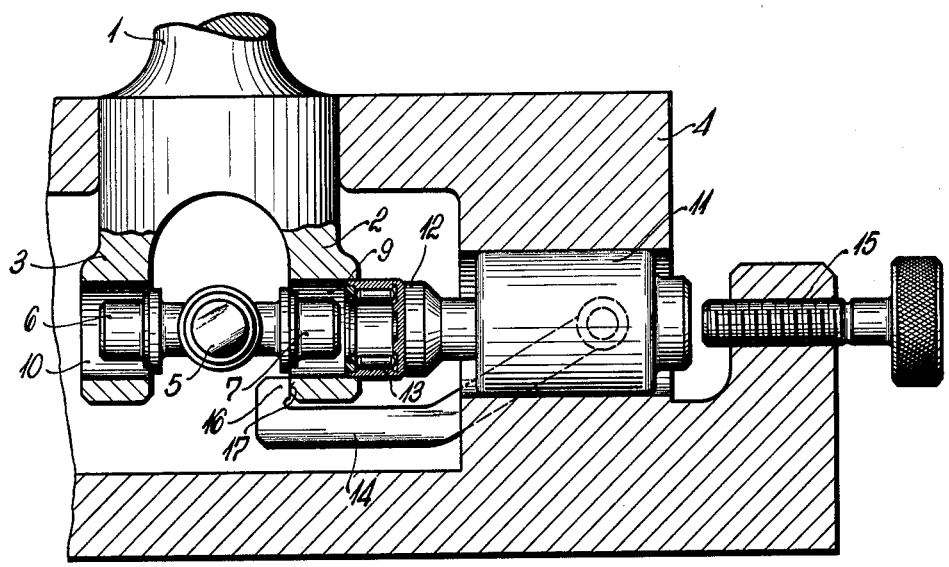
FIGS. 1 to 4 illustrate the individual steps of the method for assembling universal joints with a diagrammatically illustrated apparatus.

In the embodiment illustrated in FIGS. 1 to 4, the shaft 1, provided with fork arms 2 and 3 at its end, is fixed in apparatus 4. A universal joint spider 5 comprising two trunnions 6 and 7 which are at right angles to the shaft 1 is held by a mounting (not shown) and its position therein is centered with respect to the shaft 1 and bores 9 and 10 in the fork arms 2 and 3, respectively. Device 11 produces a force which through the agency of ram 12 presses bearing 13 into the bore 9 of fork arm 2 until play-free abutment against the trunnion 7 is brought about. A supporting clip 14 is provided between device 11 and fork arm 2 to transmit the reaction force resulting from the pressing-in force. Thus, on the one hand the fork arm 2 is loaded by the pressing-in force and on the other hand by the equally great reaction force. As a result, the forces acting on the fork arm are in equilibrium, so that the arm remains in its predetermined position during the pressing-in operation.

The device 11 may be displaced in the axial direction of the fork arm bore 9, so that variations in the dimensions of the thickness of the fork arm 2 may readily be compensated for. It is merely necessary to bring the device 11 into the appropriate position before the holding clips 14 are applied against the fork arm 2.

As will be explained in more detail hereinafter, to obtain pre-loading between the bearing 13 and the bore 9, the device 11 must be capable of moving to a certain extent opposite to the pressing-in direction. If a fixed abutment were used, this extent of movement would vary in different universal joints depending on the different positions of the device, but it is desirable that the amount of pre-load should be of the same magnitude in all universal joints. To achieve this, an adjustable abutment member 15 is provided which, before or during the pressing-in operation, is brought into the position of abutment and then shifted back to the desired extent.

Figure 2:
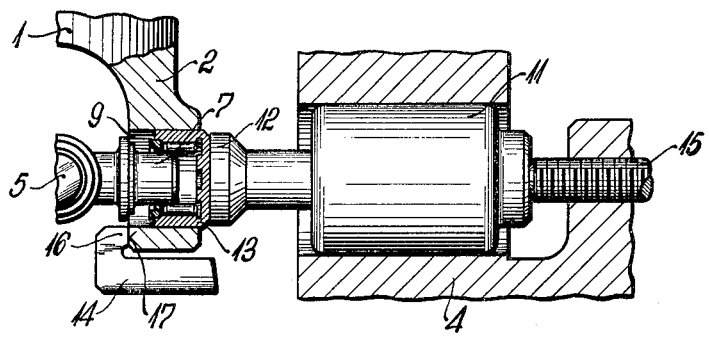

The way in which the beginning of the method is carried out is shown in FIGURE 1. A hook 16 on the holding clip 14, connected to the pressing-in device 11, is applied against the inner surface 17 of the fork arm 2, so that the reaction force which now begins from the pressing-in operation which now begins can be transmitted by the device to the fork arm. FIGURE 2 shows a further step in the method. During or before the pressing-in of the bearing 13 into the bore 9, the abutment member 15 is applied against the device 11 so that displacement of the device opposite to the pressing-in direction is limited.

Figure 3:
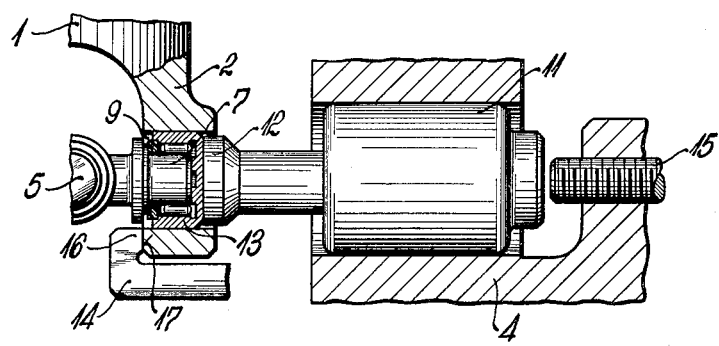

As shown in FIGURE 3, after the bearing 13 has been pressed-in against the trunnion 7 until play-free abutment is achieved and after the abutment member has been shifted back to a certain extent, the pressing-in force is made to act further on the bearing. Since the bearing 13 is abutting on the spider trunnion 7 and thus cannot be pressed-in further, the pressing-in force acts through the bearing on the spider trunnion and no longer on the fork arm, so that the equilibrium of forces is disturbed. The reaction force which still acts on the fork arm 2 and is transmitted by the clip 14 to the arm, moves the fork arm and the device 11 opposite to the pressing-in direction to the extent previously allowed at the abutment member. Thus, by virtue of its elasticity, the fork arm is pressed aside from its original position opposite to the pressing-in to a relative movement of the bearing 13 into the bore.

Figure 4:
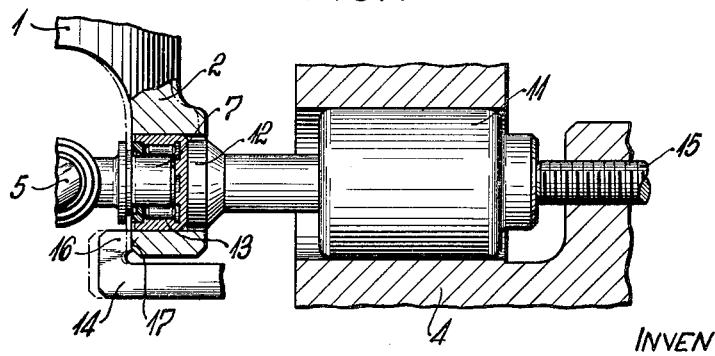

In this position, shown in FIGURE 4, the bearing 13 is so fixed in the bore 9 (in a manner not shown) that the axial forces, which act on the bearing opposite to the pressing-in direction and occur during the operation, can be transmitted to the fork arm 2. After the pressing-in force is removed, the fork arm 2, owing to the pre-loading which has been produced by the said elastic pressing-aside operation, tends to return to its original position. It can no longer return to its old position however, due to the bearing fixed in the meantime in the bore 9 of the fork arm 2, so that the pre-load acts on the bearing 13 and presses it against the trunnion 7.

Figure 5:
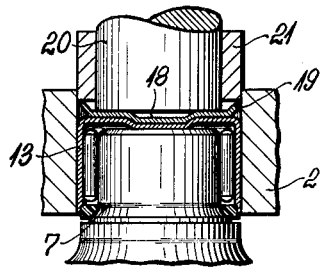
FIG. 5 shows the fixing of the bearing in the bore of the fork arm by means of an expanding disc.

The fixing of the bearing in its final position, which is carried out during or immediately after the widening of the fork arm, may be effected, for example, by expanding disc 18 as shown in FIGURE 5. The disc has peripheral projections 19 which form an acute angle with the wall of the bore and are directed opposite to the pressing-in direction. By means of an annular ram 21 which surrounds a pressing-in ram 20 and which is displaceable relative to the ram 20, the projections 19 are depressed and they dig into the wall of the bore and thereby prevent the widened fork arm from moving back and prevent the bearing from being pressed-out due to the axial forces occurring during operation.

Figure 6:
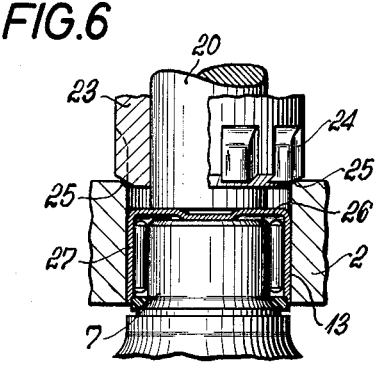
FIG. 6 shows the fixing of the bearing in the bore of the fork arm by forming-on noses with a double ram arrangement.
Figure 7:
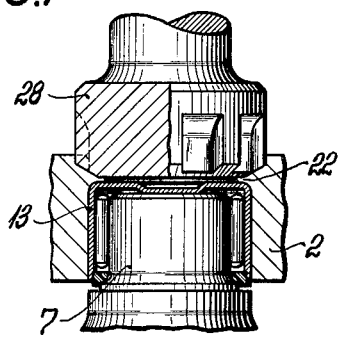
FIG. 7 shows the pressing-in and fixing of the bearing in the bore of the fork arm with a single ram.

Alternatively, instead of using the expanding disc 18, it is possible to form from the bore wall, by impact extrusion, noses 22, such as are shown in FIGURE 7, which bear against the end face of the bearing sleeve 13. As shown in FIGURE 6, an annular ram 23 surrounding the pressing-in ram 20 is provided with projections 24, whose outer edges are situated on a diameter which is greater than the diameter of the bore and the end faces 25 of these projections form an obtuse angle with the axis of the ram. When the ram 23 is pressed into the bore, the material is deformed in cold flow, so that the noses 22 may be formed and bear against the end face 26 of the bearing sleeve 27.

FIGURE 7 shows a simplification of this method in which the pressing-in ram 20 and a caulking ram 23 are combined to form a single ram 28. Simultaneous with the pressing-in of the bearing, the noses 22 are formed so that when the bearing 13 is applied against the trunnion 7 and the fork arm 2 is pressed aside, the bearing is fixed in the bore. In this case, the fitting of the spider, or at least one of its bearings, is completed directly after the fork arm has been pressed aside.

FIGURE 8 shows one embodiment of the apparatus for assembling universal joints. The righthand half of the figure shows the apparatus before the pressing-in operation whereas the left-hand half shows the position after pressing-in. The shaft 1 is fixed between hydraulically-operated holding members 29 and the universal joint spider 5 with its two trunnions 6 and 7 arranged at right angles to the shaft axis, is mounted in a prismatic guide (not shown) and centered with respect to the bores 9 and 10 in the fork arms 2 and 3.

The device for producing the pressing-in force is comprised of a cylinder 30 which is displaceable in the apparatus 4 in the direction of the fork arm bore 9 or 10 as the case may be. In the cylinder 30, a piston 31 is connected to the pressing-in ram 20 by means of a compression spring 32. The cylinder 30 is connected to the holding clip 14 which, by its hook 16, can engage on the inner surface of the fork arm 2 or 3. At the side remote from the fork arm, the cylinder 30 has a stud-like projection 33 whose face 34 is not at right angles to the bore axis. Projecting over the face 34 is a sleeve 35 which is slidably mounted on the stud 33 and the face 36 thereof has the same inclination as that of the end face 34. The sleeve 35 is pressed by a spring 37 beyond the face 34 so as to abut against a flange 38 on a nut 39, which is connected by means of a screwthread to the cylinder 30 so that, by turning the nut 39, the extent by which the face 36 projects beyond the face 34 can be adjusted. The force of the spring 37 is so calculated that it is greater than the force which occurs when the abutment member abuts. The adjustable part of the abutment member is formed by a wedge 40 which is movable at right angles to the direction of displacement of the cylinder 30. The wedge surface is inclined in the direction of movement in accordance with the inclination of the surfaces 34 and 36.

In order to press the bearing in, a cylinder chamber 42 is first filled with oil under pressure through a conduit II and this oil subjects the free face 43 of the piston to pressure. The force thus produced acts through the agency of the spring 32, whose force is so great that a rigid connection is established between the piston and the ram for the time being on the ram 20 and through the ram presses the bearing 13 into the bore 9 of the fork arm 2. The pressure generated in the cylinder chamber 42 at the same time acts on the face 44 of the cylinder and tends to press it away in opposition to the pressing-in direction. The pressure is transmitted through the holding clip 14 to the fork arm 2 and there has the effect of compensating the pressing-in force. The equilibrium of forces thus arrived at at the fork arm 2 causes the latter during the pressing-in operation to remain in the position which it also assumes in the non-loaded state. At the beginning of and/or during the pressing-in operation, a chamber 45 is filled with oil through the conduit III. As a result, the wedge 40 with its wedge surface 41 is moved at right angles to the direction of displacement of the cylinder 30 in the direction towards the centre line thereof until the wedge surface 41 abuts against the face 36 of the sleeve 35. The force produced in the pressure chamber 45 is so calculated that the force generated when the wedge abuts is less than the spring force of the spring 37.

After the bearing 13 has been pressed-in by the ram 20 until play-free abutment against the trunnion 7 is arrived at, the pressure in the conduit II and therefore in the chamber 42 is increased. Further pressing-in of the bearing 13 is no longer possible since it abuts against the trunnion 7, so that the force which acts on the piston face 43 and the cylinder surface 44 on the one hand compresses the spring 32 and presses the caulking ram 46 into the bore 9 to form noses. On the other hand, this force acts through the cylinder surface 44, and the holding clip 14 on the fork arm 2, and presses the latter in a direction opposite to the pressing-in direction, moving the cylinder 30 along in the same direction until the face 34 of the stud 33 abuts against the wedge surface 41 whereby the spring 37 is compressed. During the pressing-aside of the fork arm 2 the caulking ram 46 remains in its position, which is equivalent to a relative movement of the fork arm 4 in the pressing-in direction, and thus the formed-on noses are pressed against the end face of the bearing 13. The position thus taken up is shown in the left-hand part of FIGURE 8.

Although the pressing-in of a single bearing has been dealt with exclusively above, it is possible to press-in two bearings together or all the bearings of the spider simultaneously.

Various modifications of the method and apparatus of the invention may be made without departing from the spirit or scope thereof and it is to be understood that the invention is intended to be limited only as defined in the appended claims.

We claim:

1. A method of assembling universal joints formed by the connection of two shafts forked at their ends with a universal joint spider and having radially and axially loadable bearings for accommodating the spider trunnions in bores in the shaft forks which comprises centering the spider and the shaft forks relative to one another and pressing bearings into the bores of the fork arms until they abut without free play against the spider trunnions while supporting the reaction force resulting from the pressing-in force at the fork arms.

2. A method of assembling universal joints formed by the connection of two shafts forked at their ends with a universal joint spider and having radially and axially loadable bearings for accommodating the spider trunnions in bores in the shaft forks which comprises centering the spider and the shaft forks relative to one another, pressing bearings into the bores of the fork arms until they abut without free play against the spider trunnions while supporting the reaction force resulting from the pressing-in force at the fork arms and then increasing the pressing-in force whereby the reaction force acting on the fork arms opens-out the arms by an adjustable distance elastically opposite to the pressing-in direction while the bearings remain in play-free abutment against the trunnions.

3. A method of assembling universal joints formed by the connection of two shafts forked at their ends with a universal joint spider and having radially and axially loadable bearings for accommodating the spider trunnions in bores in the shaft forks which comprises centering the spider and the shaft forks relative to one another, pressing bearings into the bores of the fork arms until they abut without free play against the spider trunnions while supporting the reaction force resulting from the pressing-in force at the fork arms and then increasing the pressing-in force whereby the reaction force acting on the fork arms opens-out the arms by an adjustable distance elastically opposite to the pressing-in direction while the bearings remain in play-free abutment against the trunnions, and fixing the bearing which abuts in play-free manner against the trunnion in the bore of the fork arm.

4. The method of claim 1 wherein the bearings are acted upon individually.

5. The method of claim 1 wherein two oppositely-situated bearings are acted upon simultaneously.

6. The method of claim 1 wherein all the bearings are acted upon simultaneously.

7. An apparatus for assembling universal joints formed by the connection of two shafts forked at their ends with a universal joint spider and having radially and axially loadable bearings for accommodating the spider trunnions in bores in the shaft forks comprising means for centering the spider trunnions in the bores of the shaft forks, a ram means for pressing-in and/or fixing the bearing in the bore of the shaft fork arm connected to pressure applying means to provide the pressing-in force and means for transmitting reaction forces between the pressure applying means and the fork arm, the pressure applying means being displaceable relative to the fork arm in the axial direction of the bore.

8. An apparatus for assembling universal joints formed by the connection of two shafts forked at their ends with a universal joint spider and having radially and axially loadable bearings for accommodating the spider trunnions in bores in the shaft forks comprising means for centering the spider trunnions in the bores of the shaft forks, a ram means for pressing-in and/or fixing the bearing in the bore of the shaft fork arms, pressure applying means to provide the pressing-in force connected to the said ram and displaceable relative to the fork arm in the axial direction of the bore, adjustable abutment to limit the displacement travel of the pressure applying means opposite to the pressing-in direction and means for transmitting reaction forces between the pressure applying means and the fork arm.

9. The apparatus of claim 8 wherein the ram means is provided with projections whose outer edges lie on a diameter longer than the bore diameter.

10. The apparatus of claim 8 wherein the ram means is comprised of two parts displaceable relative to one another in the pressing-in direction.

11. An apparatus for assembling universal joints formed by the connection of two shafts forked at their ends with a universal joint spider and having radially and axially loadable bearings for accommodating the spider trunnions in bores in the shaft forks comprising means for centering the spider trunnions in the bores of the shaft forks, a ram means for pressing-in and/or fixing the bearing in the bore of the shaft fork arms, a hydraulic cylinder displaceable in the axial direction of the fork arm bore, a piston slidably mounted in the cylinder and connected to the ram means, adjustable abutment means to limit the displacement travel of the said cylinder opposite to the pressing-in direction and holding means on the cylinder to engage on the fork arm to transmit the reaction force.

12. An apparatus for assembling universal joints formed by the connection of two shafts forked at their ends with a universal joint spider and having radially and axially loadable bearings for accommodating the spider trunnions in bores in the shaft forks comprising means for centering the spider trunnions in the bores of the shaft forks, a ram means for pressing-in and/or fixing the bearing in the bore of the shaft fork arm, pressure applying means to provide the pressing-in force connected to the said ram and displaceable relative to the fork arm in the axial direction of the bore, adjustable abutment to limit the displacement travel of the pressure applying means opposite to the pressing-in direction and means for transmitting reaction forces between the pressure applying means and the fork arm, the said abutment means being comprised of a wedge moveable at right angles to the displacement direction of the pressure applying means and which has a wedge surface inclined in the direction of movement and capable of abutting against an inclined surface.

13. An apparatus for assembling universal joints formed by the connection of two shafts forked at their ends with a universal joint spider and having radially and axially loadably bearings for accommodating the spider trunnions in bores in the shaft forks comprising means for centering the spider trunnions in the bores of the shaft forks, a ram means for pressing-in and/or fixing the bearing in the bore of the shaft fork arm, pressure applying means to provide the pressing-in force connected to the said ram and displaceable relative to the fork arm in the axial direction of the bore, adjustable abutment to limit the displacement travel of he pressure applying means opposite to the pressing-in direction and means for transmitting reaction forces between the pressure applying means and the fork arm, the said abutment means being provided with a part which projects by adjustable amount beyond its abutment surface under the action of a force greater than the force which occurs when the abutment means abuts.

References Cited by the Examiner
UNITED STATES PATENTS 2,737,706  3/1956  Isaac et al. _____ 29—148.4
3,008,226  11/1961  Kellerman _____ 29—201

WHITMORE A. WILTZ, *Primary Examiner.*

THOMAS H. EAGER, *Examiner.*